March 1, 1966 G. M. GRASS, JR., ETAL 3,237,596
APPARATUS FOR COATING DISCRETE SOLIDS
Filed Sept. 18, 1961
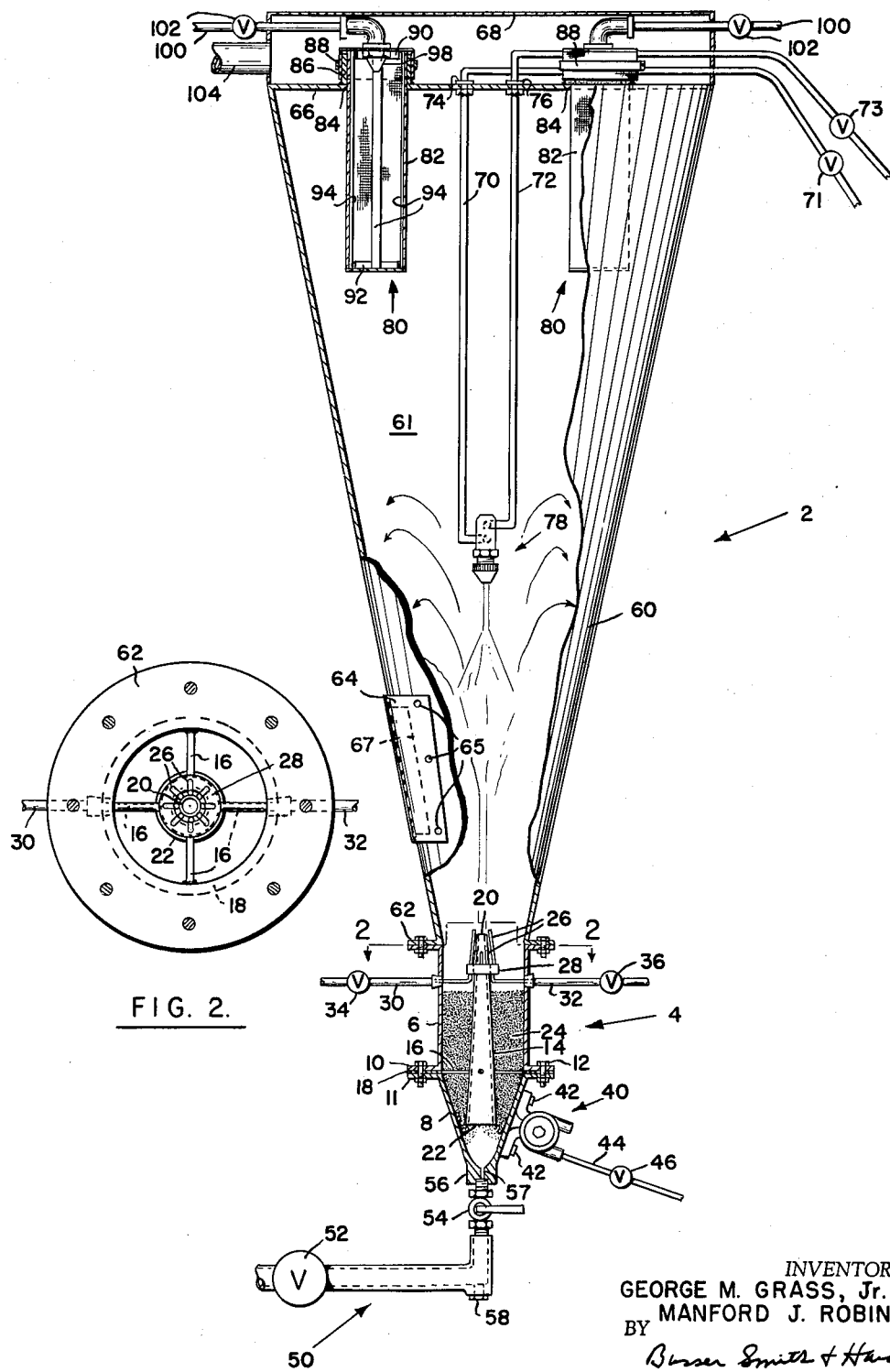
INVENTORS
GEORGE M. GRASS, Jr. &
MANFORD J. ROBINSON
BY
ATTORNEYS United States Patent Office 3,237,596
Patented Mar. 1, 1966

3,237,596
APPARATUS FOR COATING DISCRETE SOLIDS
George M. Grass, Jr., Phoenixville, Pa., and Manford J. Robinson, Moorestown, N.J., assignors to Smith Kline & French Laboratories, Philadelphia, Pa., a corporation of Pennsylvania
Filed Sept. 18, 1961, Ser. No. 138,801
12 Claims. (Cl. 118—62)

This invention relates to an apparatus and method for coating discrete solids and more particularly relates to such an apparatus and method which is of particular utility for coating fine particles of solids, for example, having a surface mean diameter ($d_{vs}$) of from about 5 to about 200 microns. By coating is meant the complete covering of the solids with a coating material.

It is known to coat discrete solids with liquefied coating materials by entraining the solids in an air stream and passing the air stream through a coating chamber into which the coating material is sprayed. Heretofore such operations have been carried out by continuously circulating the batch of material to be coated in the air stream. This involves the employment of large volumes of air at high velocity in the coating chamber which is satisfactory when the particles to be coated are relatively large. However, where the particles are relatively small such as, for example, under twenty microns in their maximum dimension, the particles tend to be carried out of the coating chamber in large volume through the system exhausting the air from the coating chamber.

Further, even with the employment of large volumes of air at high velocity the heretofore used systems failed to provide a good deagglomeration of relatively fine particles. This results from the fact that as size is reduced, the ratio of surface to mass of individual particles increases the tendency of the particles to come together and resist separation.

It is therefore the broad object of this invention to provide an apparatus and method for coating discrete solids of very small particles sizes which will prevent the removal of substantial portions of the batch being processed before the processing is completed and yet which will provide a continuous coating accompanied with excellent deagglomeration to prevent the particles from adhering to each other and forming clumps.

The method of coating discrete solids in accordance with this invention comprises forming a dense phase fluidized bed, advantageously a quiescent fluidized bed, of fine solid particles, for example, having a surface mean diameter ($d_{vs}$) of from about 5 to about 200 microns. (Reference may be had to "Fluidization" by Max Leva, published in 1959 by McGraw-Hill Book Company for details of such beds.) The movement of the particles in the bed reduces their agglomeration. Particles are continuously withdrawn from the lower portion of the bed and passed through a nozzle with a gas such as air to deagglomerate the particles and eject them upwardly above the bed into a coating zone in a coating chamber. If further deagglomeration is required, as may be desirable with the finest powders, one or more gas jets, preferably of air, are directed at the solids as they emerge from the nozzle. These jets are also desirable when added gas is desired for drying the particles after they are coated.

A liquid coating material is sprayed into the coating zone (preferably downwardly against the upwardly moving particles to inhibit agglomeration). The particles wetted with the coating material drop downwardly by gravity and are directed into the upper portion of the fluidized bed. Solidifying of the coating material on the particles occurs after the particles leave the coating zone as they travel to the fluidized bed. Rounding and smoothing of the particles occurs due to the rubbing together of the coated particles as they fall and as they move in the fluidized bed. The coated particles returned to the bed gradually move downwardly as other particles are removed from the bed and finally are again removed themselves to be recycled for another coating. The process is continued until the particles are satisfactorily coated with the desired amount of coating material. Thereafter, the particles are preferably further cycled in the apparatus as described above without the introduction of any coating material to further harden the coatings.

The method and apparatus of the invention can be used in applying a wide variety of liquefied coating materials to solids of any kind. Typical uses are for example coating drugs, foodstuffs or other chemicals with liquefied waxes, resins, glycerides, fatty acids or polymers. The purpose of such coatings could be for example, taste masking, sustained dissolution, enteric properties, improved stability, delayed interaction, wettability and improved flow properties.

The method and apparatus suitable for carrying out the method will be clarified on reading the following description in conjunction with the drawings in which:

FIGURE 1 is a front elevation partially broken away of a coating apparatus in accordance with this invention; and FIGURE 2 is a horizontal section taken on the plane indicated by the line 2—2 in FIGURE 1.

Referring first to FIGURE 1, a coating apparatus 2 has a fluidized bed casing 4 comprising a cylindrical upper section 6 and a frustum-shaped lower portion 8 which are respectively provided with flanges 10 and 11 secured together by bolts indicated at 12. Advantageously a plane tangent to portion 8 will lie at an angle to the vertical preferably lying at an angle of at least 20° to the horizontal. A powder nozzle tube 14 extends upwardly within casing 4 being supported by a spider 16 having a ring portion 18 which is held between flanges 10 and 11. Powder nozzle 14 has its relatively small inner and outer diameters at its upper end 20 and its relatively large inner and outer diameters at its base end 22. Base end 22 is located relatively close to the inner surface of lower section 8 to form a restricted opening. Casing 4 is adapted to contain a fluidized bed 24 of fine discrete solids, the level of bed 24 extending up into upper section 6 but below the upper end 20 of powder nozzle 14.

Referring both to FIGURES 1 and 2, a plurality of upwardly extending nozzles 26 whose axes are directed at the axis of nozzle 14 have their lower ends connected to a manifold ring 28 which is adapted to slide over the upper end of tube 14 and is secured thereto by a pressed fit. Manifold ring 28 is supplied with air under pressure by air supply lines 30 and 32 which are controlled respectively by valves 34 and 36.

As shown in FIGURE 1, an air actuated vibrator 40 is secured to the lower section 8 of casing 4 by bolts 42 and is supplied with air under pressure by air supply line 44 controlled by valve 46. A vibrator of the type shown in U.S. Patent No. 2,518,250 is satisfactory as are electrically actuated vibrators.

For the entrainment of the solids, air under pressure is supplied by an air supply line 50 controlled by valve 52. Line 50 is connected to a cock indicated at 54 which in turn is secured to a hollow boss 56 at the lower end of section 8. Boss 56 has a restricted nozzle opening 57, the upper end of which curves outwardly to meet the inner diameter of casing 4. A plug 58 is screwed into line 50 directly below casing 4 in order to permit the withdrawal of the processed material.

A frustum-shaped casing 60 forms a coating chamber 61 and has its lower end flanged to the upper section 6 of reservoir 4 as indicated at 62. A plane tangent to the periphery of the casing 60 will make an angle of at least 20° with the horizontal. While the frustum shape of casing 60 is advantageous, the casing may be of any shape so long as its diameter is at least equal to the diameter of section 6 and it will direct the particles into bed 24 as they fall after being coated. A cover 64 is secured to casing 60 by bolts indicated at 65 to provide access to the interior of coating chamber 61 through opening 67.

The upper end of casing 60 is closed by a plate 66 which in turn supports a cap member 68. An air supply line 70 controlled by valve 71 and a liquid coating material supply line 72 controlled by valve 73, respectively, pass through sealing members indicated at 74 and 76 and are connected to a downwardly directed atomizing nozzle indicated at 78.

Filters 80 in the upper portion of coating chamber 61 each are provided with a fine mesh filter bag 82 extending downwardly through opening 84 in plate 66 and having its upper open end doubled back over a pipe 86 secured to plate 66 about opening 84. A securing ring 88 overlies the upper end of bag 82 where it overlies pipe 86 to hold it securely to the pipe. Each bag 82 is maintained in an extended condition by means of a pair of spaced rings 90 and 92 to which are secured ribs 94. A clean out nozzle 98 projects into the interior of bag 82 and is supplied with air under pressure by air supply line 100 controlled by a valve 102. The air passing through filters 80 into the space between plate 66 and cap 68 is exhausted through an exhaust line indicated at 104.

*Operation*

In using the apparatus 2 to carry out the method of this invention, cover 64 is removed and a batch of solid particles is introduced into coating chamber 61 and permitted to fall down into casing 4, valve 52 and cock 54 having previously been placed in the closed position. Valve 52 is then opened to bring air up to cock 54 which is then opened to introduce a jet of air into casing 4 from nozzle opening 57. The air taking the path of least resistance moves upwardly into nozzle 14 entraining particles in the lower portion of the casing 4 and carrying them into nozzle 14. Sufficient air passes into the space between nozzle 14 and casing 4 to form fluidized bed 24 which in resisting the flow of air therethrough causes the great bulk of air introduced into casing 4 to pass through nozzle 14 at a relatively high velocity. After starting up, the air entrains particles from the bottom of fluidized bed 24 which, as shown in FIGURE 1, extends below the restricted opening formed between base 22 of nozzle 14 and the inner periphery of casing 4 in typical fashion. The velocity of the air and the entrained particles is increased as they progress toward the discharge end of nozzle 14 due to the decreasing cross-sectional area of the nozzle 14 and the entrained particles finally eject upwardly from the tube producing an upwardly extending spray of deagglomerated particles.

After the air has been turned on as described above, air and a spraying liquid are introduced into lines 70 and 72, respectively, to produce a downwardly projecting fine spray of coating material through spray nozzle 78 into a coating zone in the coating chamber 61. Thus, the upwardly projected particles pass through the sprayed coating material and are wetted. After being wetted, the particles fall against the walls of chamber 61 and drop by gravity back down into fluidized bed 24 where they move downwardly by gravity until they are again entrained by the incoming air and carried up through the cycle described again, solidifying of the coatings takes place in the coating chamber after the particles pass outside of the coating zone into the remainder of the chamber which acts as a solidifying zone. Vibrator 40 is useful where it is desired to speed up the entrainment of particles by the air and is also useful to reduce the risk of air channeling through the fluidized bed.

Powder nozzle 14 by utilizing the jet of air from nozzle opening 57 to entrain only a small proportion of the total number of particles in casing 4 and by its nozzle effect produces an excellent deagglomeration effect which is markedly effective in separating agglomerated particles. This arrangement is further advantageous in that in order to achieve the necessary spraying and deagglomerating of the particles as they are projected into the coating chamber to be coated it achieves high velocity flow using a relatively small volume of air which makes it possible in a coating chamber of practical and convenient size to cause the great bulk of material being processed to fall downwardly before reaching the top of the coating chamber. This is of marked importance in preventing the exhausting of the fine particles from the apparatus and permits operation without the necessity for the employment of a recycling system in which an exhausted material is collected and recycled back into the apparatus.

During the operation of the coating apparatus 2, air is exhausted from the coating chamber through the filters 80, the small amount of powder which is carried up to the filters being trapped by the cloth filter bags 82 which permit the exhausting of the air upwardly and out through exhaust line 104. Any desired number of filters 80 can be employed, a plurality being desirable in order that the coating apparatus 2 may operate continuously without shutting down to clean filters. Filters 80 are cleaned periodically by the opening of valve 102 to introduce air through nozzle 98 within bag 82 at a pressure greater than the pressure in the upper portion of coating chamber 61 surrounding bag 82. This operation forces the particles on the exterior of filter bag 82 to drop off and fall downwardly into the lower portion of coating chamber 61 and thence into reservoir 4. The cleaning of filter bags 82 is done in a sequence such that an adequate number of filters are operative to exhaust air from coating chamber 61.

After the particles have been recirculated a sufficient number of times to provide the desired thickness of coating, the spraying of coating material through nozzle 78 is stopped. Preferably the cycling of the particles is continued to further harden the coatings. Then cock 54 and valve 52 are closed in that order. Plug 58 is then removed and a suitable container placed thereunder. The coated particles in casing 4 are then permitted to drop downwardly through the opening which was occupied by plug 58 by opening cock 54.

Particularly when extremely fine solids having a surface mean diameter of, for example, from about 5 to about 15 microns are being coated as described above, it is advantageous to open valves 34 and 36 to introduce a gas, preferably air, into manifold ring 28 to discharge gas through nozzles 26. The jets of gas discharging from nozzle 26 are helpful in the deagglomerating of the solids being ejected from pickup tube 14 and are also useful when it is desired to have present more gas for drying the coating material on the particles.

The invention will be further clarified by the following example:

*Example*

Using the device shown in FIGURE 1, acetaminophen particles are coated with 12-hydroxystearyl alcohol in the following manner: An 800 gm. charge of acetaminophen powder comprised of essentially spherical particles having a $d_{vs}$ of about 20 microns are introduced into the device through opening 67 and come to rest in the chamber formed by casing 4. Cover 64 is put in place. Air cock 54 is opened and a sufficient quantity of air is allowed through valve 52 to cause the powder charge to form a dense phase fluid bed and also to entrain powder from the base of casing 4 through nozzle 14 where the powder is atomized from upper end 20 into chamber 61. In conjunction with this operation vibrator 40 is set in motion by controlling air supply at valve 46. The filter system jets are placed in operation. When the particles are cycling, and being atomized and deagglomerated properly the air and coating solution is introduced by the liquid atomizing nozzle 78 at a rate of 20 cc. per minute by controlling valves 71 and 73. The coating solution is 15% by weight of 12-hydroxystearyl alcohol dissolved in equal portions of chloroform and ethyl alcohol. The coating solution is thus atomized counter-current to the deagglomerated atomized powder particles. The cycling process is continued until 800 gms. of 12-hydroxystearyl alcohol in the coating solution has been sprayed onto the particles to produce a 50% coating by weight. The liquid nozzle is then shut off and the cycling continued until the particles are essentially dry. Air cock 54 and valve 52 are then closed and plug 58 opened. Cock 54 is again opened and the powder is discharged into a suitable container. Microscopic observations show these particles to be completely coated. It requires 10 hours for complete dissolution to take place in artificial intestinal fluid.

What is claimed is:

1. A device for coating fine solids comprising
    means forming an upstanding coating chamber,
    means to exhaust gas from the upper portion of the coating chamber,
    an upstanding casing having its upper end in communication with the lower end of the coating chamber, the lower portion of the casing having a decreasing cross-sectional area as it extends downwardly,
    a powder nozzle in the casing,
    said powder nozzle being supported in the casing, upwardly directed in the direction of the extension of the casing, spaced from the lower end of the casing and spaced from the casing wall to form a bed region for solids between the powder nozzle and the casing wall,
    gas supply means connected to the lower end of the casing to introduce a jet of gas substantially co-axially with the powder nozzle into the lower end of the casing to supply a flow of gas to entrain solids from the bed region and carry them through the powder nozzle for spraying upwardly into the coating chamber,
    and a spray nozzle mounted above the powder nozzle in the coating chamber for spraying coating material onto the fine solids,
    whereby the solids are circulated repeatedly for the repeated application and solidification of the coating material.

2. A device for coating fine solids comprising an upstanding coating chamber having an open lower end, means to exhaust gas from the upper portion of the coating chamber, a casing for containing solids having its upper end in communication with the lower end of the coating chamber, the lower portion of the casing having a decreasing cross-sectional area as it extends downwardly, a powder nozzle extending upwardly within the casing from a point adjacent the inner periphery of the lower portion of the casing, gas supply means to introduce a jet of gas into the casing to supply a flow of gas between the casing and the powder nozzle adapted to form a fluidized bed of solids within the casing and to entrain solids from the fluidized bed into the powder nozzle for spraying upwardly into the coating chamber, and a spray nozzle in the coating chamber adapted to spray a coating material onto the said solids.

3. A device for coating fine solids comprising an upstanding coating chamber having an open lower end, means to exhaust gas from the upper portion of the coating chamber, a casing for containing solids having its upper end in communication with the lower end of the coating chamber, the lower portion of the casing having a decreasing cross-sectional area as it extends downwardly, a powder nozzle extending upwardly within the casing from a point adjacent the inner periphery of the lower portion of the casing, gas supply means to introduce a jet of gas into the casing to supply a flow of gas between the casing and the powder nozzle to form a fluidized bed of solids within the casing and to entrain solids from the fluidized bed into the powder nozzle for spraying upwardly into the coating chamber, and a downwardly turned spray nozzle in the coating chamber adapted to spray a coating material counter-current to solids sprayed upwardly by the powder nozzle.

4. A device for coating fine solids comprising an upstanding coating chamber having an open lower end, means to exhaust gas from the upper portion of the coating chamber, a casing for containing solids having its upper end in communication with the lower end of the coating chamber, the lower portion of the casing having a decreasing cross-sectional area as it extends downwardly, a powder nozzle extending upwardly within the casing from a point adjacent the inner periphery of the lower portion of the casing, gas supply means to introduce a jet of gas into the casing to supply a flow of gas between the casing and the powder nozzle to form a fluidized bed of solids within the casing and to entrain solids from the fluidized bed into the powder nozzle for spraying upwardly into the coating chamber, means adjacent the discharge end of the powder nozzle to direct a jet of gas across the axis of the powder nozzle, and a spray nozzle in the coating chamber adapted to spray a coating material onto the said solids.

5. A device for coating fine solids comprising an upstanding coating chamber having an open lower end, means to exhaust gas from the upper portion of the coating chamber, a casing for containing solids having its upper end in communication with the lower end of the coating chamber, the lower portion of the casing having a decreasing cross-sectional area as it extends downwardly, a powder nozzle extending upwardly within the casing from a point adjacent the inner periphery of the lower portion of the casing, gas supply means to introduce a jet of gas into the casing to supply a flow of gas between the casing and the power nozzle to form a fluidized bed of solids within the casing and to entrain solids from the fluidized bed into the powder nozzle for spraying upwardly into the coating chamber, means adjacent the discharge end of the powder nozzle to direct a jet of gas across the axis of the powder nozzle and a downwardly turned spray nozzle in the coating chamber adapted to spray a coating material counter-current to solids sprayed upwardly by the powder nozzle.

6. A device for coating fine solids comprising an upstanding coating chamber having an open lower end, means to exhaust gas from the upper portion of the coating chamber, a casing for containing solids having its upper end in communication with the lower end of the coating chamber, the lower portion of the casing having a decreasing cross-sectional area as it extends downwardly, a powder nozzle extending upwardly within the casing from a point adjacent the inner periphery of the lower portion of the casing to a point adjacent the lower end of said coating chamber, gas supply means connected to the bottom of the lower portion of the casing to introduce a jet of gas into the casing to supply a flow of gas between the casing and the powder nozzle to form a dense phase fluidized bed of solids within the casing and to entrain solids from the fluidized bed into the powder nozzle for spraying upwardly into the coating chamber, and a spray nozzle in the coating chamber adapted to spray a coating material onto the said solids.

7. A device for coating fine solids comprising an upstanding coating chamber having an open lower end, means to exhaust gas from the upper portion of the coating chamber, a casing for cotaining solids having its upper end in communication with the lower end of the coating chamber, the lower portion of the casing having a decreasing cross-sectional area as it extends downwardly, a powder nozzle extending upwardly within the casing from a point adjacent the inner periphery of the lower portion of the casing, gas supply means connected to the bottom of the lower portion of the casing to introduce a jet of gas into the casing to supply a flow of gas between the casing and the powder nozzle to form a dense phase fluidized bed of solids within the casing and to entrain solids from the fluidized bed into the powder nozzle for spraying upwardly into the coating chamber, means to control the flow of gas through said gas supply line, and a spray nozzle in the coating chamber adapted to spray a coating material onto the said solids.

8. A device for coating fine solids comprising an upstanding coating chamber having an open lower end and outwardly tapering walls extending upwardly from said lower end, means to exhaust gas from the upper portion of the coating chamber, a casing for containing solids having its upper end in communication with the lower end of the coating chamber, the lower portion of the casing having a decreasing cross-sectional area as it extends downwardly, a powder nozzle extending upwardly within the casing from a point adjacent the inner periphery of the lower portion of the casing, gas supply means connected to the bottom of the lower portion of the casing to introduce a jet of gas into the casing to supply a flow of gas between the casing and the powder nozzle to form a dense phase fluidized bed of solids within the casing and to entrain solids from the fluidized bed into the powder nozzle for spraying upwardly into the coating chamber, and a spray nozzle in the coating chamber adapted to spray a coating material onto the said solids.

9. A device for coating fine solids comprising an upstanding coating chamber having an open lower end and outwardly tapering walls extending upwardly from said lower end, means to exhaust gas from the upper portion of the coating chamber, a casing for containing solids having its upper end in communication with the lower end of the coating chamber, the lower portion of the casing having a decreasing cross-sectional area as it extends downwardly, a powder nozzle extending upwardly within the casing from a point adjacent the inner periphery of the lower portion of the casing, gas supply means connected to the bottom of the lower portion of the casing to introduce a jet of gas into the casing to supply a flow of gas between the casing and the powder nozzle to form a dense phase fluidized bed of solids within the casing and to entrain solids from the fluidized bed into the powder nozzle for spraying upwardly into the coating chamber, and a downwardly turned spray nozzle in the coating chamber adapted to spray a coating material countercurrent to solids sprayed upwardly by the powder nozzle.

10. A device for coating fine solids comprising an upstanding coating chamber having an open lower end and outwardly tapering walls extending upwardly from said lower end, means to exhaust gas from the upper portion of the coating chamber, a casing for containing solids having its upper end in communication with the lower end of the coating chamber, the lower portion of the casing having a decreasing cross-sectional area as it extends downwardly, a powder nozzle extending upwardly within the casing from a point adjacent the inner periphery of the lower portion of the casing, gas supply means connected to the bottom of the lower portion of the casing to introduce a jet of gas into the casing to supply a flow of gas between the casing and the powder nozzle to form a dense phase fluidized bed of solids within the casing and to entrain solids from the fluidized bed into the powder nozzle for spraying upwardly into the coating chamber, means adjacent the discharge end of the powder nozzle to direct a jet of gas across the axis of the powder nozzle, and a spray nozzle in the coating chamber adapted to spray a coating material onto the said solids.

11. A device for coating fine solids comprising an upstanding coating chamber having an open lower end and outwardly tapering walls extending upwardly from the said lower end, means to exhaust gas from the upper portion of the coating chamber, a casing for containing solids having its upper end in communication with the lower end of the coating chamber, the lower portion of the casing having a decreasing cross-sectional area as it extends downwardly, a powder nozzle extending upwardly within the casing from a point adjacent the inner periphery of the lower portion of the casing, gas supply means connected to the bottom of the lower portion of the casing to introduce a jet of gas into the casing to supply a flow of gas between the casing and the powder nozzle to form a dense phase fluidized bed of solids within the casing and to entrain solids from the fluidized bed into the powder nozzle for spraying upwardly into the coating chamber, means adjacent the discharge end of the powder nozzle to direct a jet of gas across the axis of the powder nozzle and a downwardly turned spray nozzle in the coating chamber adapted to spray a coating material counter-current to solids sprayed upwardly by the powder nozzle.

12. A device for coating fine solids comprising an upstanding coating chamber having an open lower end, means to exhaust gas from the upper portion of the coating chamber, a casing for containing solids having its upper end in communication with the lower end of the coating chamber, the lower portion of the casing having a decreasing cross-sectional area as it extends downwardly, a vibrator connected to the casing, a powder nozzle extending upwardly within the casing from a point adjacent the inner periphery of the lower portion of the casing, gas supply means connected to the bottom of the lower portion of the casing to introduce a jet of gas into the casing to supply a flow of gas between the casing and the powder nozzle to form a dense phase fluidized bed of solids within the casing and to entrain solids from the fluidized bed into the powder nozzle for spraying upwardly into the coating chamber, and a spray nozzle in the coating chamber adapted to spray a coating material onto the said solids.

References Cited by the Examiner

UNITED STATES PATENTS

| | | | |
|---|---|---|---|
| 2,270,341 | 1/1942 | Ransburg | 117—100 X |
| 2,561,392 | 7/1951 | Marshall | 117—100 |
| 2,561,393 | 7/1951 | Marshall | 117—100 |
| 2,768,095 | 10/1956 | Tadema et al. | 117—100 |
| 2,919,160 | 12/1959 | Blackburn. | |
| 2,986,475 | 3/1961 | Mesnard et al. | 117—100 |
| 3,001,228 | 9/1961 | Nack | 117—100 |

FOREIGN PATENTS 1,238,170   6/1960   France.

WILLIAM D. MARTIN, *Primary Examiner.*

RICHARD D. NEVIUS, *Examiner.*